US008654030B1

(12) United States Patent
Mercer

(10) Patent No.: US 8,654,030 B1
(45) Date of Patent: Feb. 18, 2014

(54) ANTENNA PLACEMENT

(71) Applicant: Microsoft Corporation, Redmond, WA (US)

(72) Inventor: Sean Russell Mercer, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/656,520

(22) Filed: Oct. 19, 2012

Related U.S. Application Data

(60) Provisional application No. 61/714,713, filed on Oct. 16, 2012.

(51) Int. Cl.
*H01Q 3/24* (2006.01)

(52) U.S. Cl.
USPC .................... 343/876; 343/702; 343/893

(58) Field of Classification Search
USPC .......... 343/725, 824, 872, 873, 893, 702, 876
See application file for complete search history.

(56) References Cited

U.S. PATENT DOCUMENTS

| | | | |
|---|---|---|---|
| 4,046,975 A | 9/1977 | Seeger, Jr. | |
| 4,065,649 A | 12/1977 | Carter et al. | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,588,187 A | 5/1986 | Dell | |
| 4,607,147 A | 8/1986 | Ono et al. | |
| 4,651,133 A | 3/1987 | Ganesan et al. | |
| 5,220,521 A | 6/1993 | Kikinis | |

(Continued)

FOREIGN PATENT DOCUMENTS

| | | |
|---|---|---|
| EP | 2353978 | 8/2011 |
| JP | 10326124 | 12/1998 |

OTHER PUBLICATIONS

Li, et al., "Characteristic Mode Based Tradeoff Analysis of Antenna-Chassis Interactions for Multiple Antenna Terminals," In *IEEE Transactions on Antennas and Propagation*, Retrieved from <http://ieeexplore.ieee.org/stamp/stamp.jsp?tp=&arnumber=6060882>, (Feb. 2012), 13 pages.

(Continued)

*Primary Examiner* — Dieu H Duong
(74) *Attorney, Agent, or Firm* — Jeremy Snodgrass; Glen Johnson; Micky Minhas

(57) ABSTRACT

Antenna placement techniques are described. In one or more embodiments, a computing device includes an antenna suite having multiple different kinds of antennas. An antenna zone for the antenna suite may be established along a particular edge of the computing device. Non-interfering materials (e.g., RF transparent material) may be used within the antenna zone and other materials (e.g., metal) may be employed for other regions of the device. The multiple different kinds of antennas in the antenna suite may then be disposed within the established antenna zone. The antennas may be placed to minimize interference between antennas and/or achieve performance objective for the suite of antennas. In one approach, a suite of five antennas may be placed along a top edge of a computing device in a landscape orientation.

20 Claims, 13 Drawing Sheets

(56) References Cited

U.S. PATENT DOCUMENTS

| | | |
|---|---|---|
| 5,283,559 A | 2/1994 | Kalendra et al. |
| 5,331,443 A | 7/1994 | Stanisci |
| 5,548,477 A | 8/1996 | Kumar et al. |
| 5,558,577 A | 9/1996 | Kato |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,874,697 A | 2/1999 | Selker et al. |
| 5,926,170 A | 7/1999 | Oba |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,178,443 B1 | 1/2001 | Lin |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,506,983 B1 | 1/2003 | Wilson et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,051,149 B2 | 5/2006 | Wang et al. |
| 7,083,295 B1 | 8/2006 | Hanna |
| 7,091,436 B2 | 8/2006 | Serban |
| 7,106,222 B2 | 9/2006 | Ward et al. |
| 7,123,292 B1 | 10/2006 | Seeger et al. |
| 7,194,662 B2 | 3/2007 | Do et al. |
| 7,213,991 B2 | 5/2007 | Chapman et al. |
| 7,277,087 B2 | 10/2007 | Hill et al. |
| 7,447,934 B2 | 11/2008 | Dasari et al. |
| 7,469,386 B2 | 12/2008 | Bear et al. |
| 7,499,037 B2 | 3/2009 | Lube |
| 7,502,803 B2 | 3/2009 | Culter et al. |
| 7,542,052 B2 | 6/2009 | Solomon et al. |
| 7,558,594 B2 | 7/2009 | Wilson |
| 7,559,834 B1 | 7/2009 | York |
| 7,620,244 B1 | 11/2009 | Collier |
| 7,636,921 B2 | 12/2009 | Louie |
| 7,639,876 B2 | 12/2009 | Clary et al. |
| 7,656,392 B2 | 2/2010 | Bolender |
| 7,733,326 B1 | 6/2010 | Adiseshan |
| 7,773,076 B2 | 8/2010 | Pittel et al. |
| 7,777,972 B1 | 8/2010 | Chen et al. |
| 7,782,342 B2 | 8/2010 | Koh |
| 7,813,715 B2 | 10/2010 | McKillop et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,945,717 B2 | 5/2011 | Rivalsi |
| 7,973,771 B2 | 7/2011 | Geaghan |
| 7,978,281 B2 | 7/2011 | Vergith et al. |
| 8,018,386 B2 | 9/2011 | Qi et al. |
| 8,026,904 B2 | 9/2011 | Westerman |
| 8,053,688 B2 | 11/2011 | Conzola et al. |
| 8,065,624 B2 | 11/2011 | Morin et al. |
| 8,069,356 B2 | 11/2011 | Rathi et al. |
| 8,077,160 B2 | 12/2011 | Land et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,229,509 B2 | 7/2012 | Paek et al. |
| 8,229,522 B2 | 7/2012 | Kim et al. |
| 2002/0134828 A1 | 9/2002 | Sandbach et al. |
| 2003/0197687 A1 | 10/2003 | Shetter |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0057515 A1 | 3/2005 | Bathiche |
| 2005/0059489 A1 | 3/2005 | Kim |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2005/0285703 A1 | 12/2005 | Wheeler et al. |
| 2006/0049993 A1* | 3/2006 | Lin et al. .................. 343/702 |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0195522 A1 | 8/2006 | Miyazaki |
| 2007/0062089 A1 | 3/2007 | Homer et al. |
| 2007/0072474 A1 | 3/2007 | Beasley et al. |
| 2007/0182663 A1 | 8/2007 | Biech |
| 2007/0200830 A1 | 8/2007 | Yamamoto |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0104437 A1 | 5/2008 | Lee |
| 2008/0151478 A1 | 6/2008 | Chern |
| 2008/0158185 A1 | 7/2008 | Westerman |
| 2008/0167832 A1 | 7/2008 | Soss |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073060 A1* | 3/2009 | Shimasaki et al. ............ 343/702 |
| 2009/0073957 A1 | 3/2009 | Newland et al. |
| 2009/0079639 A1* | 3/2009 | Hotta et al. .................. 343/702 |
| 2009/0127005 A1 | 5/2009 | Zachut et al. |
| 2009/0140985 A1 | 6/2009 | Liu |
| 2009/0163147 A1 | 6/2009 | Steigerwald et al. |
| 2009/0251008 A1 | 10/2009 | Sugaya |
| 2009/0262492 A1 | 10/2009 | Whitchurch et al. |
| 2009/0303137 A1* | 12/2009 | Kusaka et al. ................ 343/702 |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053534 A1 | 3/2010 | Hsieh et al. |
| 2010/0077237 A1 | 3/2010 | Sawyers |

(56) References Cited

U.S. PATENT DOCUMENTS

| | | | |
|---|---|---|---|
| 2010/0081377 A1 | 4/2010 | Chatterjee et al. |
| 2010/0085321 A1 | 4/2010 | Pundsack |
| 2010/0103112 A1 | 4/2010 | Yoo et al. |
| 2010/0149111 A1 | 6/2010 | Olien |
| 2010/0149134 A1 | 6/2010 | Westerman et al. |
| 2010/0156798 A1 | 6/2010 | Archer |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0206644 A1 | 8/2010 | Yeh |
| 2010/0214257 A1 | 8/2010 | Wussler et al. |
| 2010/0222110 A1 | 9/2010 | Kim et al. |
| 2010/0231556 A1 | 9/2010 | Mines et al. |
| 2010/0238075 A1 | 9/2010 | Pourseyed |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2010/0331059 A1 | 12/2010 | Apgar et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0037721 A1 | 2/2011 | Cranfill et al. |
| 2011/0043990 A1 | 2/2011 | Mickey et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102356 A1 | 5/2011 | Kemppinen et al. |
| 2011/0134032 A1 | 6/2011 | Chiu et al. |
| 2011/0157087 A1 | 6/2011 | Kanehira et al. |
| 2011/0163955 A1 | 7/2011 | Nasiri et al. |
| 2011/0164370 A1 | 7/2011 | Mcclure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0242138 A1 | 10/2011 | Tribble |
| 2011/0248920 A1 | 10/2011 | Larsen |
| 2011/0261001 A1 | 10/2011 | Liu |
| 2011/0290686 A1 | 12/2011 | Huang |
| 2011/0297566 A1 | 12/2011 | Gallagher et al. |
| 2011/0304577 A1 | 12/2011 | Brown |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0013519 A1* | 1/2012 | Hakansson et al. | 343/835 |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0075249 A1 | 3/2012 | Hoch |
| 2012/0081316 A1 | 4/2012 | Sirpal et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0115553 A1 | 5/2012 | Mahe et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0182242 A1 | 7/2012 | Lindahl et al. |
| 2012/0194393 A1 | 8/2012 | Utterman et al. |
| 2012/0194448 A1 | 8/2012 | Rothkopf |
| 2012/0223866 A1 | 9/2012 | Ayala et al. |
| 2012/0224073 A1 | 9/2012 | Miyahara |
| 2012/0235635 A1* | 9/2012 | Sato | 320/108 |
| 2012/0246377 A1 | 9/2012 | Bhesania |
| 2012/0256959 A1 | 10/2012 | Ye et al. |
| 2012/0274811 A1 | 11/2012 | Bakin |
| 2012/0300275 A1 | 11/2012 | Vilardell et al. |
| 2013/0063873 A1 | 3/2013 | Wodrich et al. |
| 2013/0227836 A1 | 9/2013 | Whitt, III |
| 2013/0228435 A1 | 9/2013 | Whitt, III |
| 2013/0229356 A1 | 9/2013 | Marwah |
| 2013/0229366 A1 | 9/2013 | Dighde |
| 2013/0229759 A1 | 9/2013 | Whitt, III |
| 2013/0335902 A1 | 12/2013 | Campbell |

OTHER PUBLICATIONS

"Accessing Device Sensors", retrieved from <https://developer.palm.com/content/api/dev-guide/pdk/accessing-device-sensors.html> on May 25, 2012, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"Cholesteric Liquid Crystal", Retrieved from: <http://en.wikipedia.org/wiki/Cholesteric_liquid_crystal> on Aug. 6, 2012,(Jun. 10, 2012), 2 pages.

"Cirago Slim Case®—Protective case with built-in kickstand for your iPhone5®", Retrieved from <http://cirago.com/wordpress/wp-content/uploads/2012/ipc1500brochure1.pdf> on Jan. 29, 2013, (Jan. 2013),1 page.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, 4 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", *Interlink Electronics*, Available at <http://staff.science.uva.nl/~vlaander/docu/FSR/An_Exploring_Technology.pdf>, (Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"How to Use the iPad's Onscreen Keyboard", Retrieved from <http://www.dummies.com/how-to/content/how-to-use-the-ipads-onscreen-keyboard.html> on Aug. 28, 2012, 3 pages.

"i-Interactor electronic pen", Retrieved from: <http://www.alibaba.com/product-gs/331004878/i_Interactor_electronic_pen.html> on Jun. 19, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", *Android Developers*, retrieved from <http://developer.android.com/guide/topics/sensors/sensors_motion.html> on May 25, 2012, 7 pages.

"MPC Fly Music Production Controller", *AKAI Professional*, Retrieved from: <htttp://www.akaipromp.com/mpc-fly> on Jul. 9, 2012, 4 pages.

"NI Releases New Maschine & Maschine Mikro", Retrieved from <http://www.djbooth.net/index/dj-equipment/entry/ni-releases-new-maschine-mikro/> on Sep. 17, 2012 19 pages.

"Non-Final Office Action", U.S. Appl. No. 13/471,001, (Feb. 19, 2013),15 pages.

(56) References Cited

OTHER PUBLICATIONS

"Non-Final Office Action", U.S. Appl. No. 13/471,139, (Mar. 21, 2013),12 pages.
"Non-Final Office Action", U.S. Appl. No. 13/471,202, (Feb. 11, 2013),10 pages.
"Non-Final Office Action", U.S. Appl. No. 13/471,336, (Jan. 18, 2013),14 pages.
"Non-Final Office Action", U.S. Appl. No. 13/651,195, (Jan. 2, 2013),14 pages.
"Non-Final Office Action", U.S. Appl. No. 13/651,232, (Jan. 17, 2013),15 pages.
"Non-Final Office Action", U.S. Appl. No. 13/651,272, (Feb. 12, 2013),10 pages.
"Non-Final Office Action", U.S. Appl. No. 13/651,287, (Jan. 29, 2013),13 pages.
"Non-Final Office Action", U.S. Appl. No. 13/651,304, (Mar. 22, 2013), 9 pages.
"Non-Final Office Action", U.S. Appl. No. 13/651,327, (Mar. 22, 2013), 6 pages.
"Non-Final Office Action", U.S. Appl. No. 13/651,871, (Mar. 18, 2013),14 pages.
"Non-Final Office Action", U.S. Appl. No. 13/651,976, (Feb. 22, 2013),16 pages.
"Non-Final Office Action", U.S. Appl. No. 13/653,321, (Feb. 1, 2013),13 pages.
"Non-Final Office Action", U.S. Appl. No. 13/653,682, (Feb. 7, 2013),11 pages.
"Notice of Allowance", U.S. Appl. No. 13/470,633, (Mar. 22, 2013), 7 pages.
"On-Screen Keyboard for Windows 7, Vista, XP with Touchscreen", Retrieved from <www.comfort-software.com/on-screen-keyboard.html> on Aug. 28, 2012, (Feb. 2, 2011), 3 pages.
"Position Sensors", *Android Developers*, retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html>on Jun. 27, 2012, 3 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013),6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.
"SolRxTM E-Series Multidirectional Phototherapy Expandable TM 2-Bulb Full Body Panel System", Retrieved from: <http://www.solarcsystems.com/us_multidirectional_uv_light_therapy_1_intro.html> on Jul. 25, 2012,(2011), 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008), 11 Pages.
"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.

Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Das, Apurba et al., "Study of Heat Transfer through Multilayer Clothing Assemblies: A Theoretical Prediction", Retrieved from <http://www.autexrj.com/cms/zalaczone_pliki/5_013_11.pdf>, (Jun. 2011), 7 pages.
Dietz, Paul H., et al., "A Practical Pressure Sensitive Computer Keyboard", In Proceedings of UIST 2009,(Oct. 2009), 4 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Hanlon, Mike "ElekTex Smart Fabric Keyboard Goes Wireless", Retrieved from: <http://www.gizmag.com/go/5048/> on May 7, 2012,(Jan. 15, 2006), 5 pages.
Iwase, Eiji "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> *Proceedings: Journal of Microelectromechanical Systems*, (Dec. 2005), 7 pages.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Piltch, Avram "ASUS Eee Pad Slider SL101 Review", Retrieved from <http://www.laptopmag.com/review/tablets/asus-eee-pad-slider-sl101.aspx>, (Sep. 22, 2011), 5 pages.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.
Qin, Yongqiang et al., "pPen: Enabling Authenticated Pen and Touch Interaction on Tabletop Surfaces", *In Proceedings of ITS 2010*, Available at <http://www.dfki.de/its2010/papers/pdf/po172.pdf>,(Nov. 2010), pp. 283-284.
Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.
Takamatsu, Seiichi et al., "Flexible Fabric Keyboard with Conductive Polymer-Coated Fibers", In Proceedings of Sensors 2011,(Oct. 28, 2011), 4 pages.
Valliath, G T., "Design of Hologram for Brightness Enhancement in Color LCDs", Retrieved from <http://www.loreti.it/Download/PDF/LCD/44_05.pdf> on Sep. 17, 2012, 5 pages.

(56) References Cited

OTHER PUBLICATIONS

Williams, Jim "A Fourth Generation of LCD Backlight Technology", Retrieved from <http://cds.linear.com/docs/Application%20Note/an65f.pdf>, (Nov. 1995), 124 pages.

Zhang, et al., "Model-Based Developement of Dynamically Adaptive Software", *In Proceedings of ICSE 2006*, Available at <http://www.irisa.fr/lande/lande/icse-proceedings/icse/p371.pdf>, (May 20, 2006), pp. 371-380.

"PCT Search Report and Written Opinion", Application No. PCT/US2013/028948, Jun. 21, 2013, 11 pages.

"Restriction Requirement", U.S. Appl. No. 13/715,229, Aug. 13, 2013, 7 pages.

"Restriction Requirement", U.S. Appl. No. 13/715,133, (Oct. 28, 2013), 6 pages.

"Restriction Requirement", U.S. Appl. No. 13/715,133, (Dec. 3, 2013), 6 pages.

* cited by examiner

ANTENNA PLACEMENT

RELATED APPLICATIONS

This application claims priority under 35 U.S.C. §119(e) to U.S. Provisional Patent Application No. 61/714,713, filed Oct. 16, 2012, and titled "Antenna Placement", the entire disclosure of which is incorporated by reference in its entirety.

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. Some mobile computing devices may incorporate multiple antennas to support various wireless subsystems and communications. The multiple antennas may include for example one or more Wi-Fi, Bluetooth, global navigation satellite system (GNSS), near field communication (NFC) and/or cellular antennas.

Arranging antennas within a small form factor device, such as a tablet presents a significant challenge. This problem may be compounded as the number of antennas increases. To avoid interference between different antennas, traditional devices may separate antennas by utilizing multiple edges of the device for antenna placements. In order to provide acceptable antenna performance, though, the materials and other features (metal components/cases, connectors, buttons, speakers, etc.) that may be placed along the multiple edges may be limited in this approach, which is a substantial restriction on product design. Moreover, common hand positions used with tablets and other mobile devices may adversely affect antenna performance for antennas placed at or near these hand positions. Thus, traditional placements may be inadequate for some devices and antenna combinations.

SUMMARY

Antenna placement techniques are described. In one or more embodiments, a computing device includes an antenna suite having multiple different kinds of antennas. An antenna zone for the antenna suite may be established along a particular edge of the computing device. Non-interfering materials (e.g., RF transparent material) may be used within the antenna zone and other materials (e.g., metal) may be employed for other regions of the device. The multiple different kinds of antennas in the antenna suite may then be disposed within the established antenna zone. The antennas may be placed to minimize interference between antennas and/or achieve performance objective for the suite of antennas. In one approach, a suite of five antennas may be placed along a top edge of a computing device in a landscape orientation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

To avoid interference between different antennas, traditional devices may separate antennas by utilizing multiple edges of the device for antenna placements, which may tie-up these edges with RF keep outs and create substantial restrictions on product design. Accordingly, traditional placements may be inadequate for some devices and antenna combinations.

Antenna placement techniques are described. In one or more embodiments, a computing device includes an antenna suite having multiple different kinds of antennas. An antenna zone for the antenna suite may be established along a particular edge of the computing device. Non-interfering materials (e.g., RF transparent material) may be used within the antenna zone and other materials (e.g., metal) may be employed for other regions of the device. The multiple different kinds of antennas in the antenna suite may then be disposed within the established antenna zone. The antennas may be placed to minimize interference between antennas and/or achieve performance objectives for the suite of antennas. In one approach, a suite of five antennas may be placed along a top edge of a computing device in a landscape orientation.

In the following discussion, an example environment and devices are first described that may employ the techniques described herein. Example implementations and procedures are then described which may occur in the example environment and by the devices as well as in other environments and by other devices. Consequently, the example implementations and procedures are not limited to the example environment/devices and the example environment/devices are not limited to performance of the example implementations and procedures.

Example Operating Environment

Figure 1:
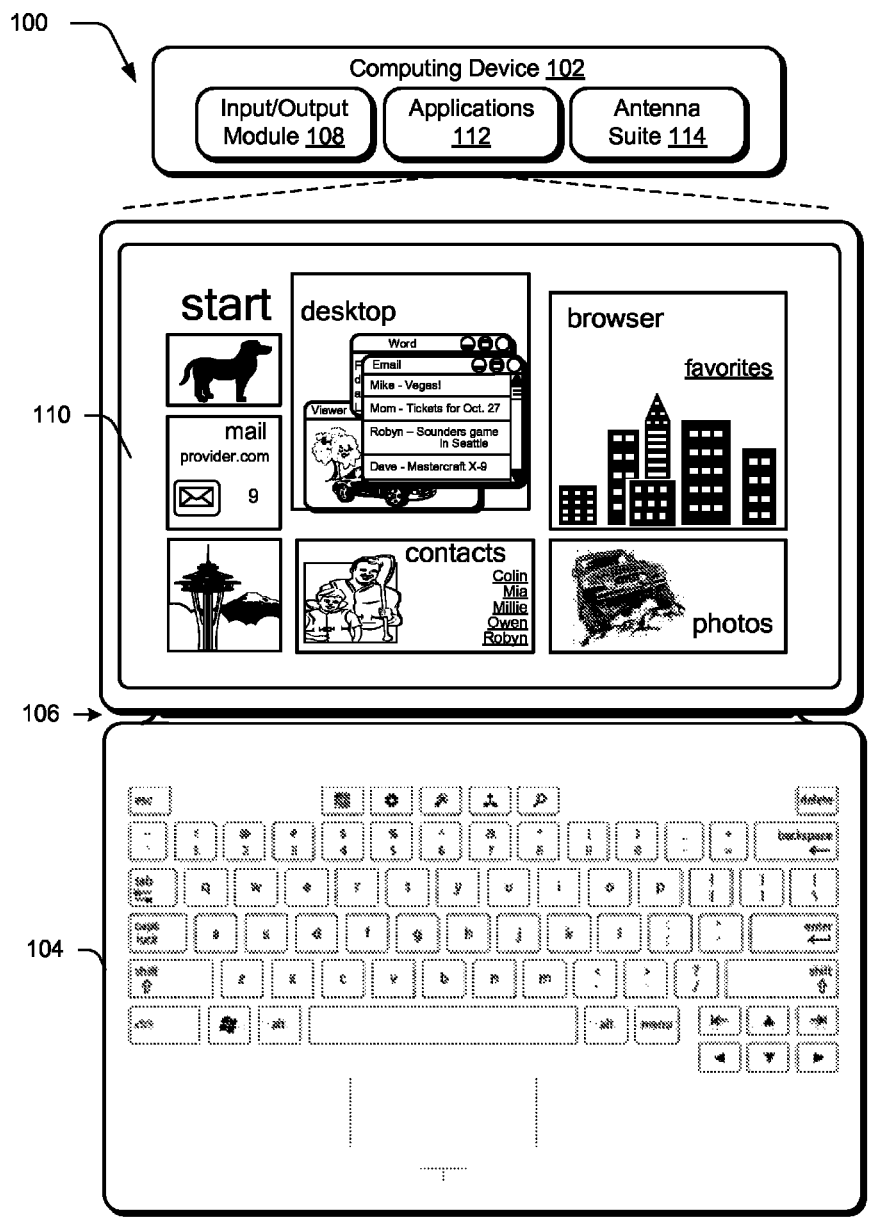
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a computing device 102 that is physically and communicatively coupled to an accessory device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device, keys of a virtual keyboard displayed by the display device 110 to identify gestures and cause operations to be performed that correspond to the gestures that may be recognized through the accessory device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the accessory device 104 is a device configured as a keyboard having a QWERTY arrangement of keys although other arrangements of keys are also contemplated. Further, other non-conventional configurations for an accessory device 104 are also contemplated, such as a game controller, configuration to mimic a musical instrument, a power adapter, an accessory to provide wireless functionality, and so forth. Thus, the accessory device 104 may assume a variety of different configurations to support a variety of different functionality. Different accessory devices may be connected to the computing device at different times.

As previously described, the accessory device 104 is physically and communicatively coupled to the computing device 102 in this example through use of a flexible hinge 106. The flexible hinge 106 represents one illustrative example of an interface that is suitable to connect and/or attach and accessory device to a host computing device 102. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device 104 in relation to the computing device 102. This may be used to support consistent alignment of the accessory device 104 in relation to the computing device 102, such as to align sensors used to change power states, application states, and so on.

The flexible hinge 106, for instance, may be formed using one or more layers of fabric and include conductors formed as flexible traces to communicatively couple the accessory device 104 to the computing device 102 and vice versa. This communication, for instance, may be used to communicate a result of a key press to the computing device 102, receive power from the computing device, perform authentication, provide supplemental power to the computing device 102, and so on. The flexible hinge 106 or other interface may be configured in a variety of ways to support multiple different accessory devices 104, further discussion of which may be found in relation to the following figure.

As further illustrated in FIG. 1 the computing device 102 may include various applications 112 that provide different functionality to the device. A variety of applications 112 typically associated with computing devices are contemplated including, but not limited to, an operating system, a productivity suite that integrates multiple office productivity modules, a web browser, games, a multi-media player, a word processor, a spreadsheet program, a photo manager, and so forth.

The computing device 102 further includes an antenna suite 114 that is representative of various antennas employed by the computing device to implement wireless functionality, subsystems, and communications. In accordance with techniques described herein, the antenna suite 114 may include multiple different kinds of antennas (e.g., radios) that are arranged together within one or more antennas zones established for the computing device. In general, the antenna suite 114 may be placed to minimize interference between antennas and/or achieve performance objectives for the suite of antennas as a whole. The placement of the antenna suite 114 may also minimize areas of the computing device 102 and/or accessory device 104 which have restrictions that limit the materials and componentry that may be placed with or near to the antenna suite 114. Areas with such restrictions may be referred to as radio frequency (RF) keep outs. A variety of different types of antennas, combinations of different types of antennas, and arrangements of antennas are contemplated as discussed in greater detail in relation to the following figures.

Figure 2:
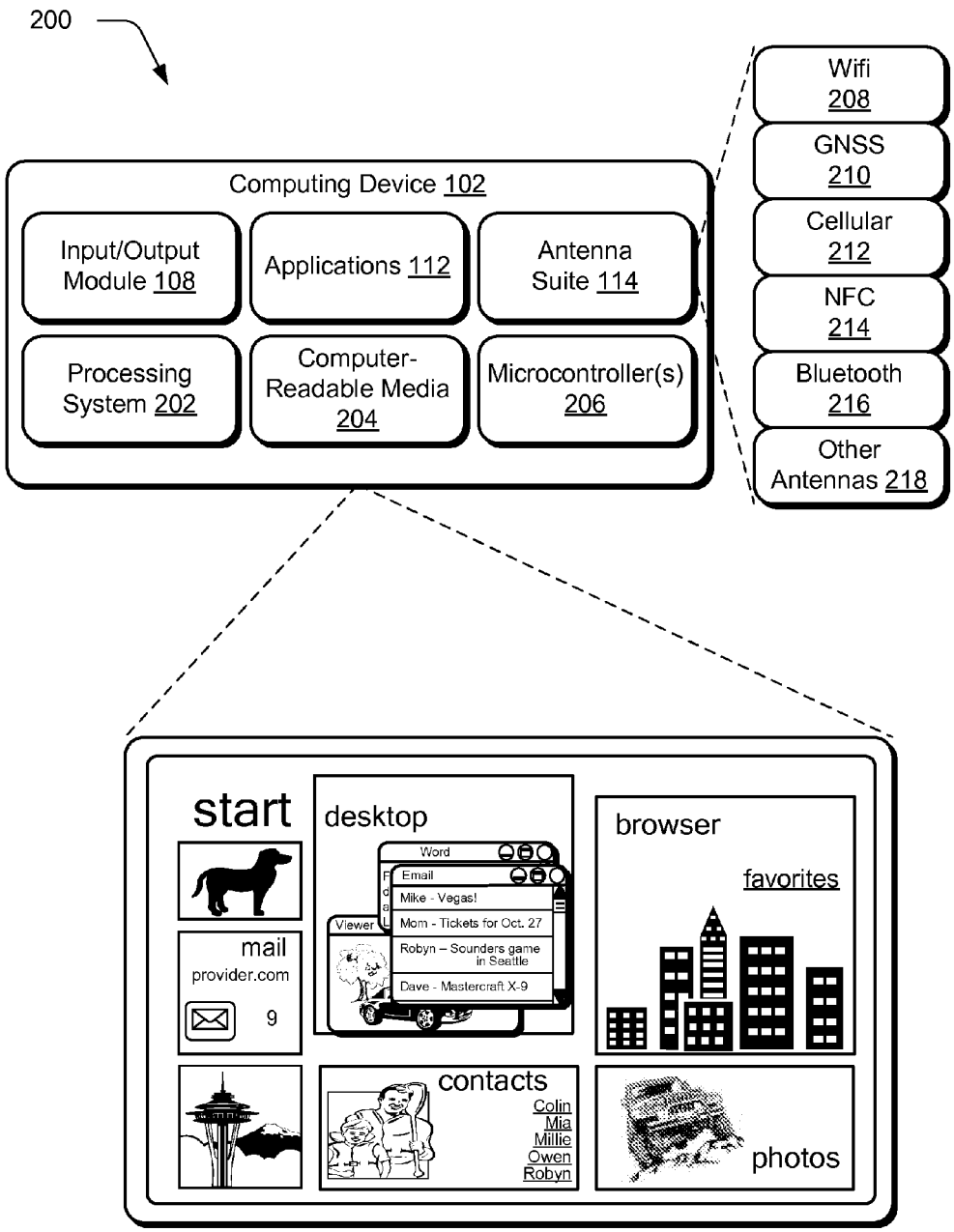
FIG. 2 depicts an example implementation of a computing device of FIG. 1 in greater detail.

To further illustrate, consider FIG. 2 which depicts generally at 200 an example computing device 102 of FIG. 1 in greater detail. In the depicted example, the computing device 102 is shown in a stand-alone configuration without an accessory device 104 being attached. In addition to the components discussed in relation to FIG. 1, the example computing device of FIG. 2 further includes a processing system 202 and computer-readable media 204 that are representative of various different types and combinations of processing components, media, memory, and storage components and/or devices that may be associated with a computing device and employed to provide a wide range of device functionality. In at least some embodiments, the processing system 202 and computer-readable media 204 represent processing power and memory/storage that may be employed for general purpose computing operations. More generally, the computing device 102 may be configured as any suitable computing system and/or device that employ various processing systems and computer-readable media, additional details and examples of which are discussed in relation to the example computing system of FIG. 14.

The computing device 102 may also implement selected device functionality through one or more microcontrollers 206. The microcontrollers 206 represent hardware devices/systems that are designed to perform a predefined set of designated tasks. The microcontrollers 206 may represent respective on-chip systems/circuits having self-contained resources such as processing components, I/O devices/peripherals, various types of memory (ROM, RAM, Flash, EEPROM), programmable logic, and so forth. Different microcontrollers may be configured to provide different embedded applications/functionality that are implemented at least partially in hardware and perform corresponding tasks. The microcontrollers 206 enable performance of some tasks outside of operation of a general purpose processing system and other applications/components of the computing device or accessory device. Generally, power consumption of the microcontrollers is low in comparison with operating a general purpose processing system for a device.

As further depicted, the computing device 102 may further include an antenna suite 114 as previously discussed. A variety of different types of antennas suitable for the antenna suite 114 are contemplated as represented in FIG. 2. By way of example, the antenna suite 114 may include one or more Wi-Fi 208 antennas, global navigation satellite system (GNSS) 210 antennas, cellular 212 antennas, Near Field Communication (NFC) 214 antennas, Bluetooth 216 antennas, and/or other 218 antennas. In accordance with techniques described herein, the antenna suite 114 includes multiple antennas that may be interdependent upon one another and/or are arranged/designed in combination. In some scenarios, some wireless technologies may be implemented using two or more individual radios/antennas.

For instance, the Wi-Fi 208 antennas may employ a two-by-two multiple input/multiple output configuration (e.g., 2×2 MIMO). The Wi-Fi 208 antennas may include at least a main and a MIMO antenna in some configurations. In addition, a Bluetooth 216 antenna may optionally be combined with the Wi-Fi 208 antennas. Further, modern cellular technologies such as Long Term Evolution (LTE), WiMax, and/or 4G may employ two or more cellular 212 antennas, such as a main cellular antenna and a MIMO cellular antenna to cover various frequencies, geographic areas, and so forth. 3G and other cellular antennas are also contemplated. The GNSS 210 antennas may be configured for use with various types of navigation standards, technologies, and systems including but not limited to GPS, GLONASS, Galileo, and/or BeiDou navigation systems, to name some examples.

Having discussed an example environment and devices, consider now some example details regarding antenna placement techniques in accordance with various implementations.

Antenna Placement Details

The following discussion presents some details regarding antenna placements and some illustrative examples. As detailed, an antenna suite having multiple different kinds of antennas may be arranged in one or more an antenna zones of the computing device. A variety of design considerations may be accounted for to determine where to place the antenna zones and antennas. Generally, antennas are placed to limit interference between antennas. Thus, antennas that may interfere with one another are isolated to the extent possible. For example, a pair of cellular antennas may be spaced apart to minimize interference. Likewise, a pair of Wi-Fi antennas (e.g., dual 2×2 MIMO antennas) may also be placed in a manner that keeps interference as low as possible given the various other design considerations that are also taken into account.

Further particular performance objectives associated with one or more antennas may be factors used to establish antenna zones and place antennas. Individual and collective performance objectives may be considered in determining where to place the antenna zone(s) and individual antennas. For example, performance priorities may be assigned to different types of antennas and placement may depend at least in part upon these priorities. Thus, for example, if priority is given to LTE/cellular performance then associated cellular 212 antennas may be placed first. On the other hand, if priority is given to Wi-Fi performance then associated Wi-Fi 208 antennas may be placed first. Additionally, performance objectives may dictate particular locations or placements for at least some antennas. By way of example, a GNSS 210 antenna generally is arranged to point skyward so as to obtain information from satellites and provide acceptable performance. Thus, suitable skyward facing real estate of the device may be considered and/or reserved for placement of a GNSS 210 antenna.

Another consideration is RF keep outs that are associated with antenna zones. The RF keep outs generally have non-interfering and/or RF transparent materials (e.g., polymers/plastics). This means that interfering material such as metal may be "kept out" of these areas. Even using interfering material in other areas may affect performance of the antenna suite 114 and therefore placement of interfering material is a factor that may be taken into account for antenna placement. In addition, the antenna placement consumes real estate of the device that may otherwise be used for connectors, interfaces, buttons, speakers, and/or other components. Thus, the amount of area and locations that are taken up by the antennas and that are available for other components may be another factor used to select antenna placements. Hand positions commonly used by users of the device may also be taken into account. In practice, trade-offs between the example considerations enumerated above as well as other considerations may be made to select a suitable arrangement that enables placement of a plurality of antennas and/or provides acceptable performance given the various different design considerations.

Figure 3:
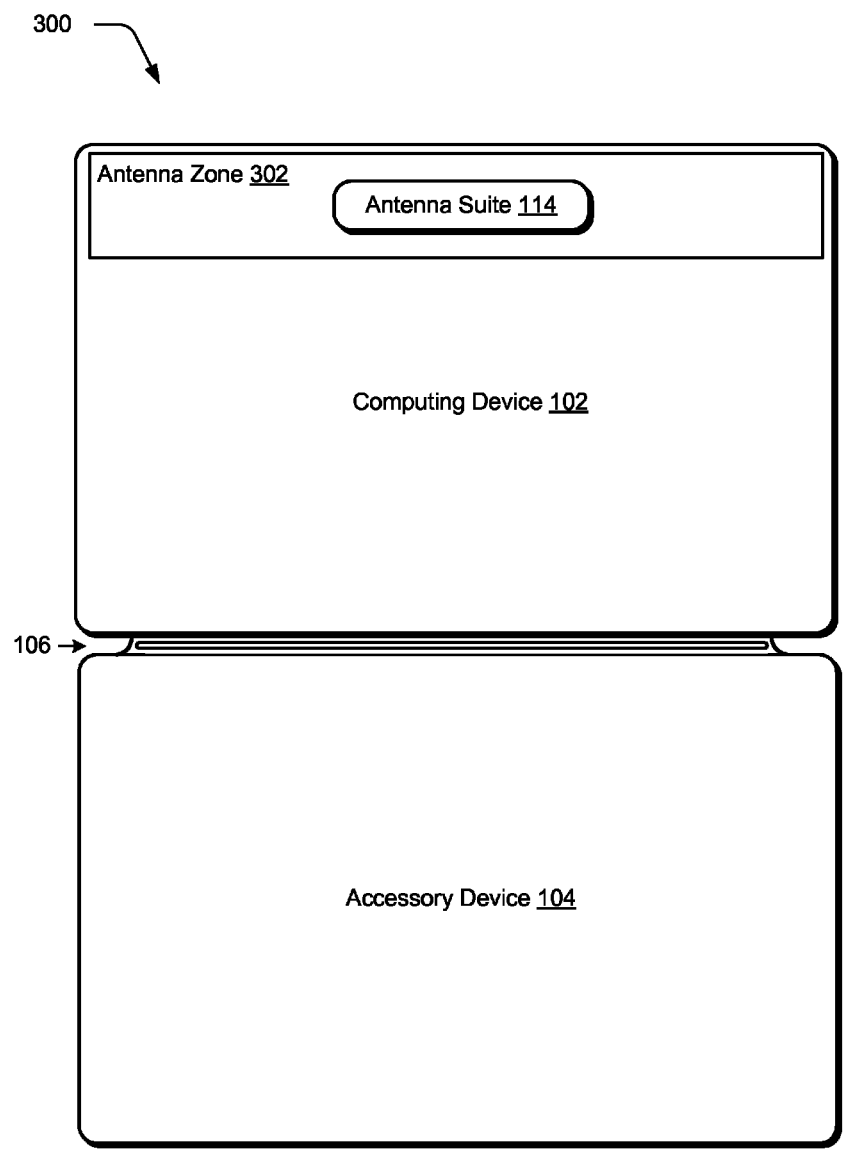
FIG. 3 depicts an example implementation of an antenna suite.

Given the foregoing context, consider now some illustrative example antenna placements in various implementations. For example, FIG. 3 depicts generally at 300 one example implementation of an antenna suite. In particular, the computing device 102 is depicted as including an antenna zone 302 that includes the antenna suite 114. Various combinations of antennas may be incorporated within the antenna suite 114. As depicted, the antenna zone 302 may be arranged along a selected edge of the computing device 102. In the illustrated example, the antenna zone 302 extends substantially across a top edge of the device in a landscape orientation. Other edges may also be selected some examples of which are discussed in relation to the following figures. In at least some implementations, the antenna suite 114 and each individual antenna of the suite are included within a single antenna zone 302. Moreover, the antenna zone 302 may be located along a single edge of the computing device 102.

The antenna suite 114 may be configured to provide multiple different types of antennas and corresponding communication and/or wireless functionality. For example, the antenna suite 114 may provide cellular functionality and at least one other type of antenna and functionality. Alternatively, an antenna suite 114 may be configured to provide Wi-Fi functionality and at least one other type of antenna and functionality. Comparable combinations including at least two or more different types of antennas are also contemplated. For instance, combinations may include different antennas to provide different types of wireless functionality including various combinations of Wi-Fi, cellular, NFC, Bluetooth, GNSS, and/or other types of antennas as described above and below.

In addition or alternatively, an antenna suite 114 may be configured to provide multiple (e.g., two or more) antennas of the same type alone or in combination with other types of antennas. For instance, an antenna suite 114 of two, three, or more cellular antennas may be implemented for some device designs. Likewise, an arrangement of two, three, or more Wi-Fi antennas may be employed. One example of such an arrangement is a dual two-by-two multiple input/multiple output (e.g., dual 2×2 MIMO) arrangement in which two Wi-Fi 208 antennas may be arranged within the example antenna zone 302 generally along the top edge of the device. In one particular placement, the two Wi-Fi 208 antennas may be spaced apart generally at opposite corners of the antenna zone away from the middle of antenna zone 302. These and other arrangements of multiple, same-type antennas may be implemented with or without including other types of antennas in the same antenna suite 114. Moreover, an antenna suite 114 may extend across one or multiple antenna zones as further discussed in relation to the following figures.

Figure 4:
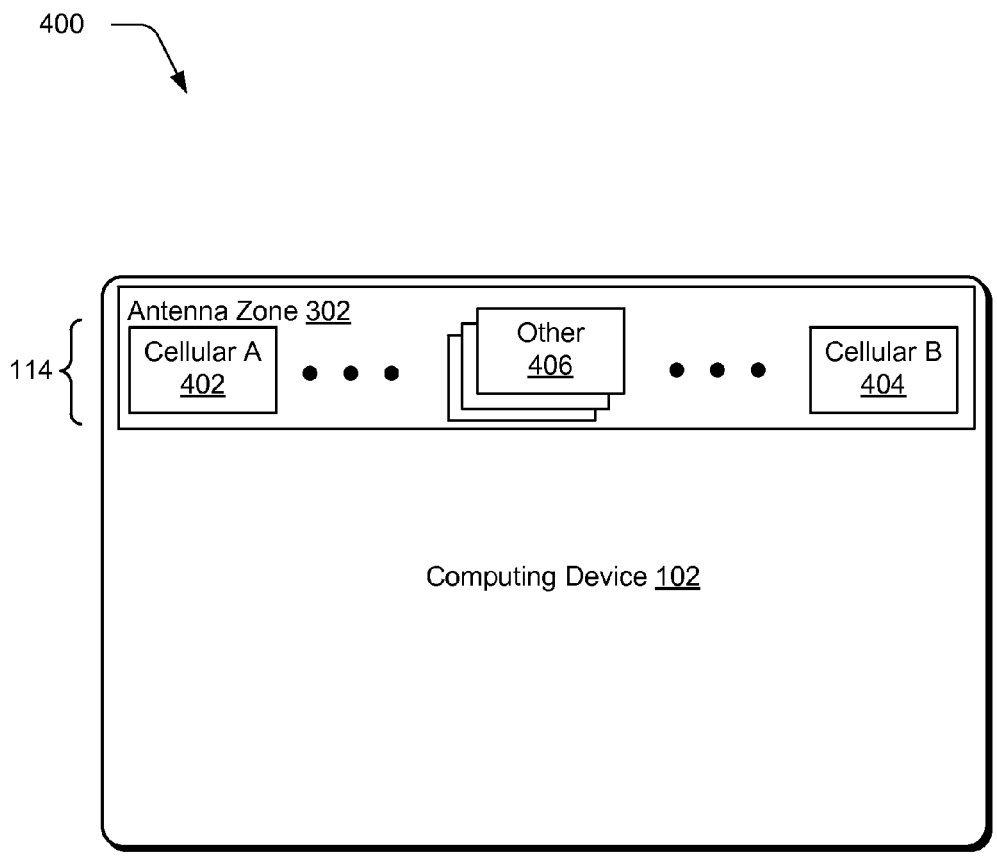
FIG. 4 depicts another example implementation of an antenna suite.

FIG. 4 depicts generally at 400 another example implementation of an antenna suite. In this example, the computing device is depicted as being disconnected from the accessory device 104. An antenna zone 302 is again depicted as being arranged generally across a top edge of the device in a landscape orientation. In this example, the antenna suite 114 is configured to include two cellular antennas, cellular A 402 and cellular B 404, and one or more other 406 antennas. The two cellular antennas may be LTE antennas designed to provide wide bandwidth coverage. Here, priority may be given to cellular performance and accordingly the two cellular antennas may be placed first. In particular, the cellular A 402 and cellular B 404 antennas are illustrated as being placed generally at the top corners of the computing device on opposite sides within the antenna zone 302. This placement spaces the two cellular antennas to isolate the antennas, minimize interference/coupling, and/or achieve bandwidth objectives. The one or more other 406 antennas may then be disposed between the two cellular antennas within the antenna zone 302 based upon one or more of the design considerations previously discussed.

Figure 5:
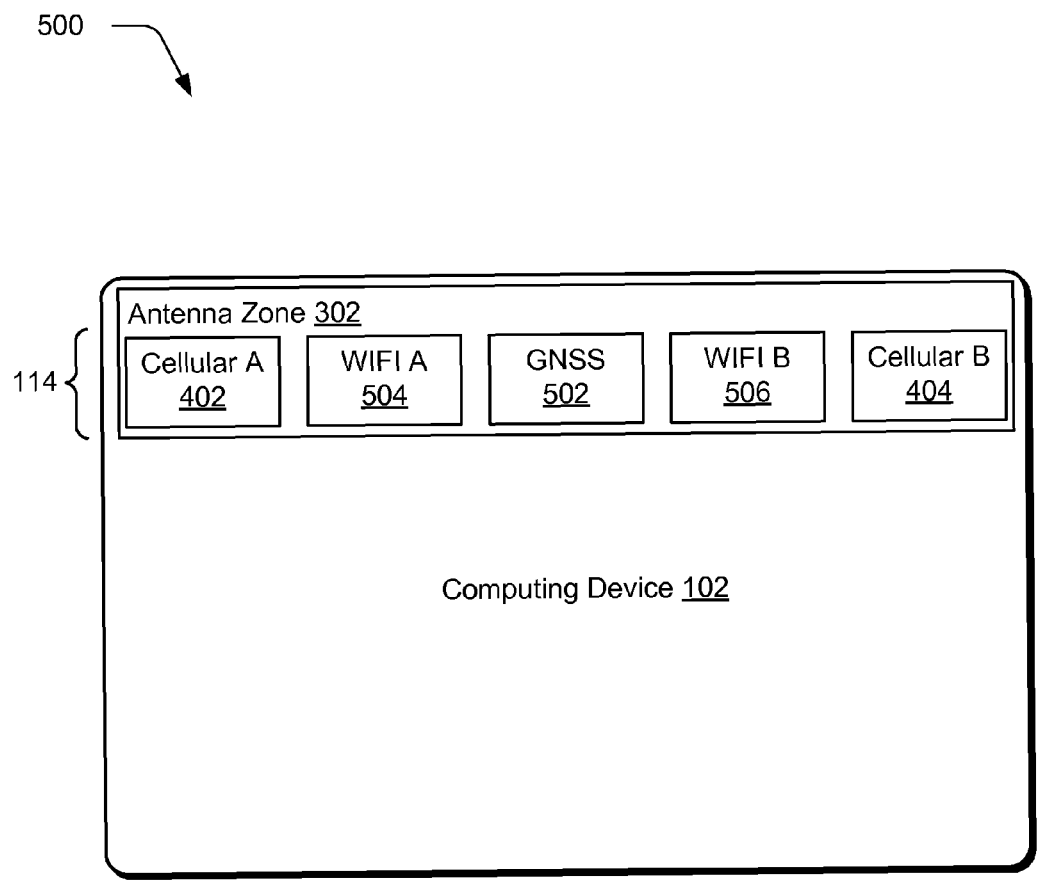
FIG. 5 depicts another example implementation of an antenna suite.

FIG. 5 depicts generally at 500 another example implementation of an antenna suite. In particular, the example of FIG. 5 has an antenna suite 114 that includes five different antennas. The arrangement of FIG. 5 shows but one example implementation for the one or more other 406 antennas described in relation to FIG. 4. In particular, the cellular A 402 and cellular B 404 antennas are again illustrated as being placed (e.g., located) generally at the opposite corners along the top edge of the computing device 102. A GNSS 502 antenna is placed between the cellular A 402 and cellular B 404 antennas generally upon the top edge and at a central position sustainably at the center of the antenna zone or suite of antennas. This provides a skyward looking position for the GNSS 502 antenna. A pair of Wi-Fi antennas, Wi-Fi A 504 and Wi-Fi B 506, are then placed at the top edge in the spaces on either side of the GNSS 502 antenna between the GNSS 502 antenna and the two cellular antennas. In this arrangement the Wi-Fi A 504 and Wi-Fi B 506 are still spaced apart to the extent possible given that the two cellular antennas are placed at the top corners. Naturally, the example antennas may be arranged differently. For example, the positions of the cellular and Wi-Fi antennas may be swapped by placing the Wi-Fi antennas at opposite corners and the cellular antennas between the Wi-Fi antennas in the antenna zone 302. A variety of other arrangements of multiple antennas in an antenna zone are also contemplated.

Notably, the suite of five antennas in this arrangement is placed along a single designated edge having the established antenna zone 302. This leaves the remaining edges available for other purposes and generally free of RF keep outs. Additionally, the designer is free to use metal and/or other material away from the top edge and antenna zone 302. Moreover, common hand positions along the short edges of the device are away from the antenna zone 302 and will have little or no impairment upon the antennas in the antenna suite 114.

Figure 6:
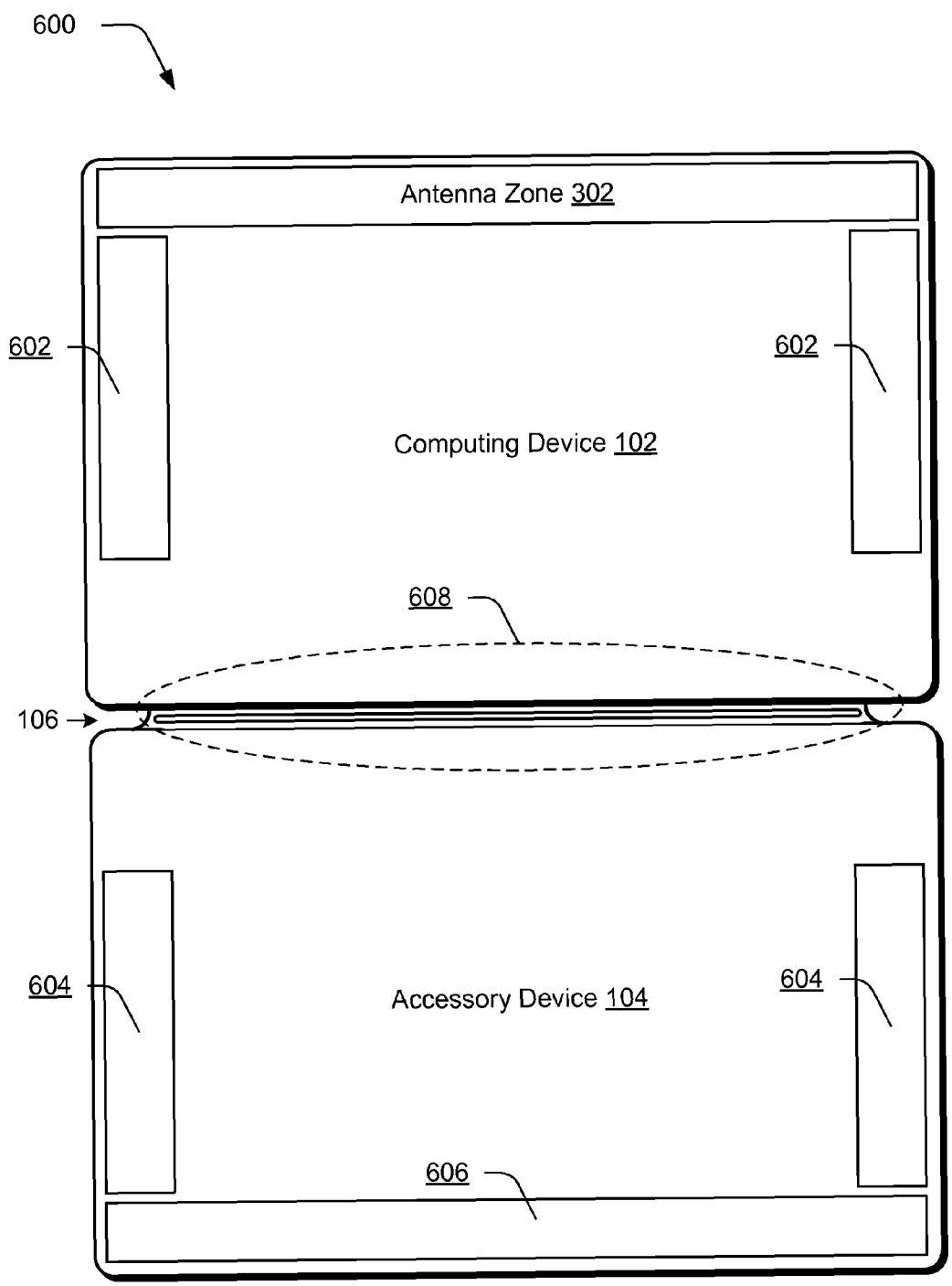
FIG. 6 depicts an implementation showing placements for one or more antenna zones of a computing device.

FIG. 6 depicts generally at 600 some different places in which antenna zones may be located. Naturally, an antenna zone 302 may be located generally along the top edge of a computing device 102 (e.g., a slate or tablet) as previously described. However, a variety of locations for antenna zones that may be used individually or in combinations are also contemplated as represented in FIG. 6. For example, antenna zones 602 may be located along one or more of the short edges of the computing device 102. Antenna zones 604, 606 may also be placed upon one or more edges of an accessory device 104 in some implementations. Generally, the area 608 providing the flexible hinge 106 or other interface between the computing device 102 and accessory device 104 may be reserved for the interface and other components. Therefore, placement of antenna zones in the area 608 may be avoided.

Antennas provided within antennas zones 604, 602 of an accessory device 104 may be designed as an alternative or a supplement to wireless functionality of the computing device 102. By way of example, an accessory device may be configured to provide supplemental cellular and/or GNSS functionality to a computing device that already provides Wi-Fi and other wireless functionality. As another example, the accessory may be configured to provide NFC functionality to a device that does not have NFC functionality. Alternatively, an antenna suite 114 of an accessory device may be implemented as an accessory to provide wireless functionally to a device that does not already have such wireless functionality. In some implementations, multiple different antenna zones of a device and/or an accessory may be employed in combinations. Any of the example antenna zones 302, 602, 604, 606 described herein may be employed individually or in combinations of multiple zones to implement various arrangements of antenna suites 114 described above and below.

Figure 7:
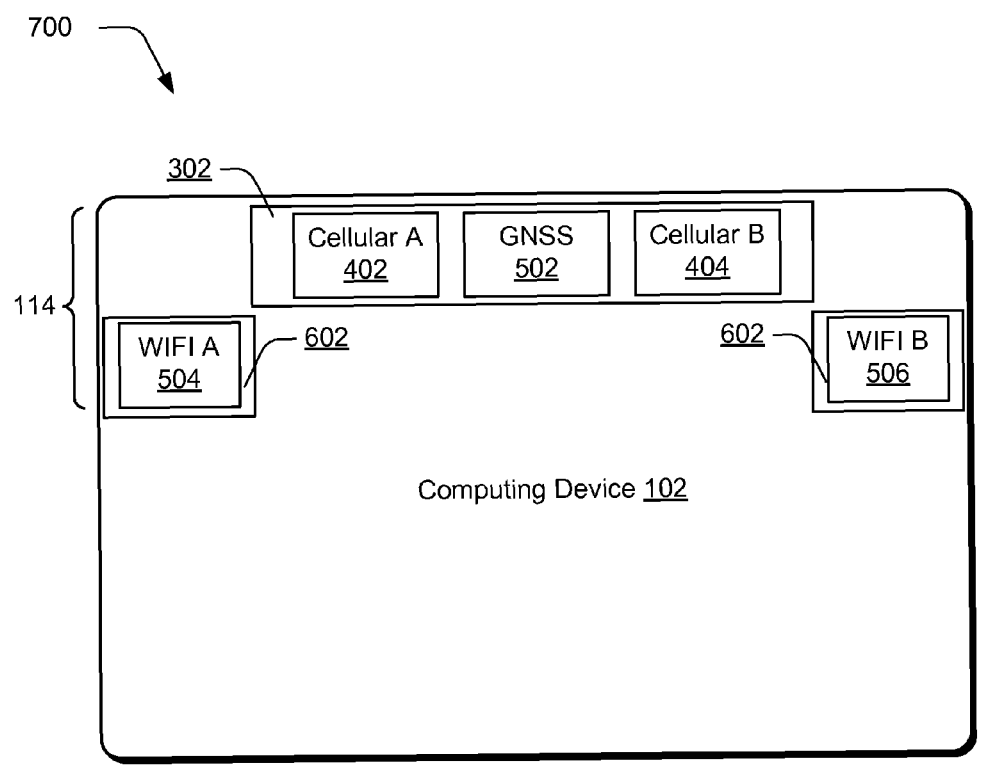
FIG. 7 depicts an example implementation of an antenna suite that uses multiple antenna zones.

By way of example, FIG. 7 depicts generally at 700 an example implementation of an antenna suite that uses multiple antenna zones. In this example, an antenna zone 302 is arranged to include three antennas of an antenna suite 114 having five antennas. The two remaining antennas are placed in antennas zones 602 along the short sides of the computing device 102. The antennas zones 602 may be offset from the top edge, but generally positioned towards the top corners of the short sides. In this way, significant real estate is preserved along the short sides below the antennas zones 602 for hand positioning and placement of other components. In particular, the antenna zone 302 includes cellular A 402 and cellular B 404 antennas spaced apart with a GNSS 502 antenna placed in the middle between the cellular antennas. A pair of Wi-Fi antennas, Wi-Fi A 504 and Wi-Fi B 506, are placed in the antennas zones 602 along the short sides. Naturally, the example antennas may be arranged differently. For example, the positions of the cellular and Wi-Fi antennas may be swapped by placing the cellular antennas in the antennas zones 602 and the Wi-Fi antennas in the antenna zone 302. A variety of other arrangements using multiple antenna zones are also contemplated.

Figure 8:
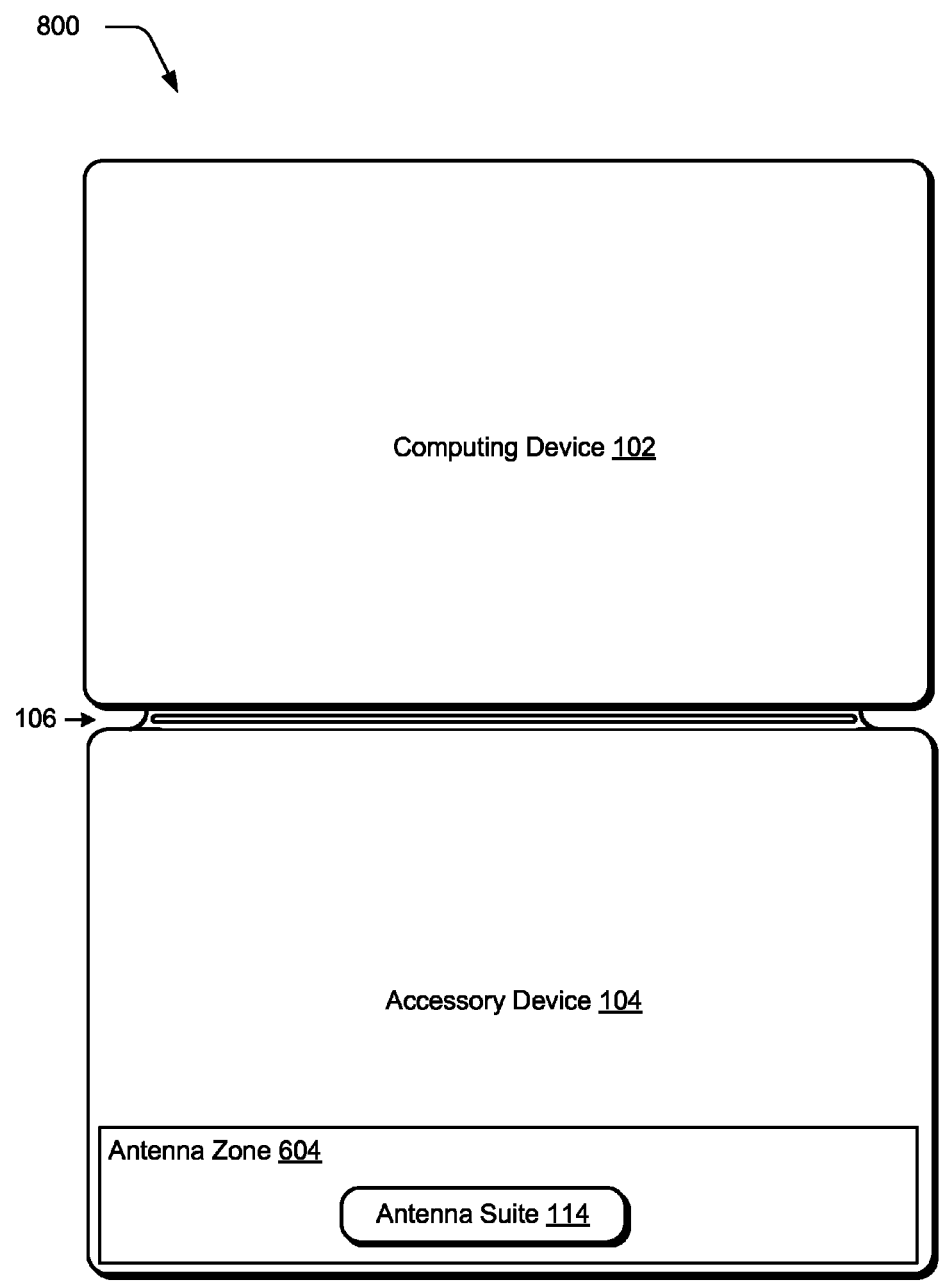
FIG. 8 depicts an example implementation of an antenna suite in connection with an accessory device.

FIG. 8 depicts generally at 800 an example implementation of an antenna suite in connection with an accessory device. In particular, a representative antenna zone 604 is provided by an accessory device 104 that may be employed to implement various arrangements of antenna suites 114 described above and below, including but not limited to the example arrangements discussed in relation to FIGS. 4, 5, and 7. In general, FIG. 8 represents that an antenna suite 114 and corresponding wireless functionality may be provided by way of an accessory device in some implementations. The antenna suite 114 provide by an accessory device may be used in lieu of or in combination with an antenna suite 114 of the computing device itself.

Figure 9:
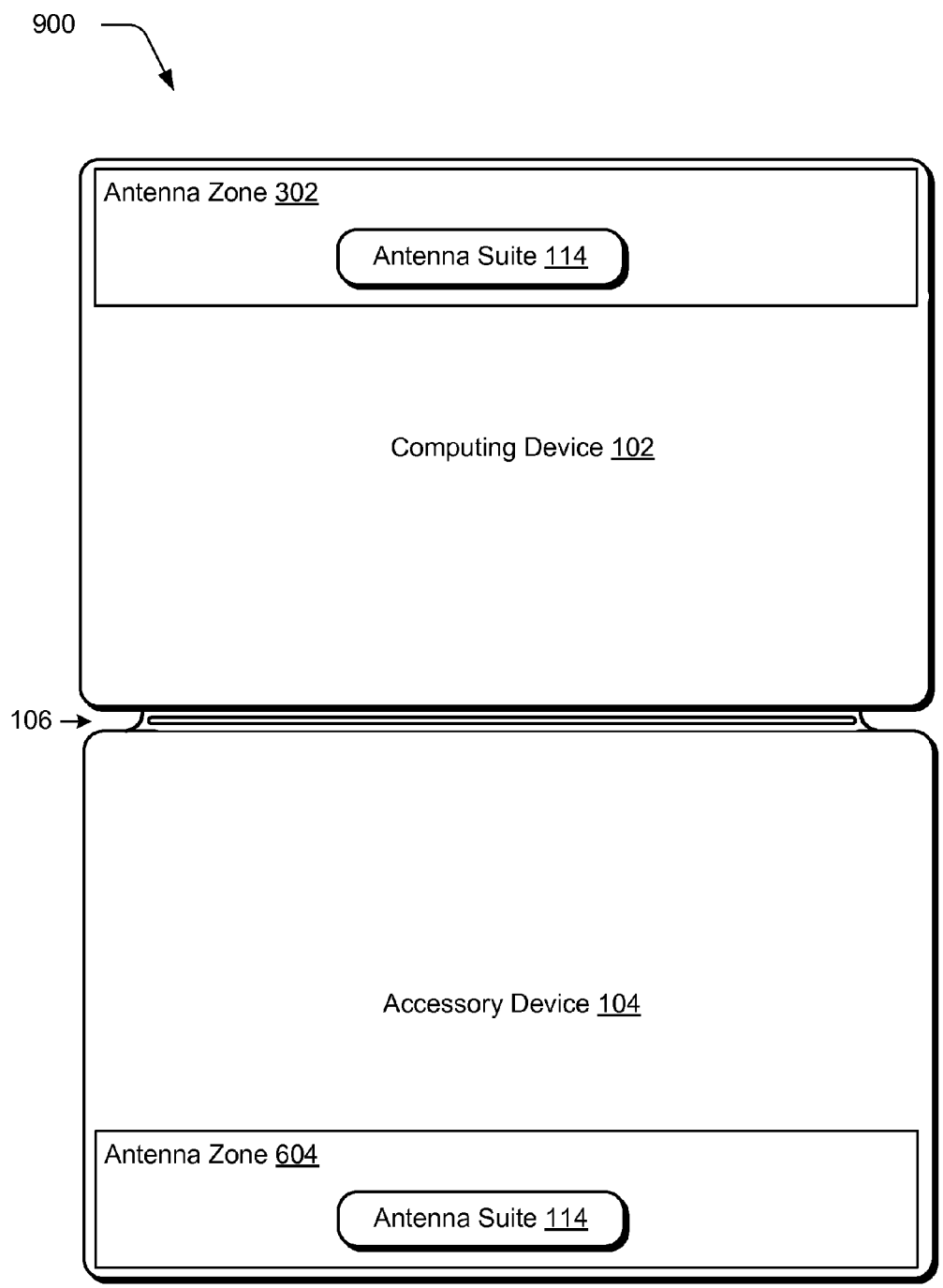
FIG. 9 depicts an example implementation in which multiple antennas zones are provided by a computing device and an accessory device to implement an antenna suite.

FIG. 9 depicts generally at 900 an example implementation in which multiple antennas zones are provided by a computing device and an accessory device to implement an antenna suite. Here, an antenna zone 302 of a computing device 102 and antenna zone 604 of an accessory device 104 may provide one or more antenna suites 114. As mentioned, different antennas may be provided in the different zones such that the accessory device adds functionality that does not exist for the computing device 102. In this approach, the accessory device may be a wireless add-on accessory that provides added functionality for wireless, cellular, GNSS and/or other technologies such as NFC and/or Bluetooth. In another example, the antenna zone 604 of an accessory device 104 may duplicate functionality provided by a computing device 102.

For example, the antenna zone 302 and antenna zone 604 may be configured to have a pair of identical antenna suites 114. Having duplicate antenna suites 114 may enable selective switching between the suites to enhance wireless performance as the computing device 102 and accessory device 104 are manipulated into different orientations relative to one another. For example, the antenna suite 114 in antenna zone 302 may be activated in a first orientation while the antenna suite 114 in antenna zone 604 is deactivated. Then, upon manipulation to a second orientation the antenna suite 114 in antenna zone 604 may become activated and the antenna suite 114 in antenna zone 302 may be deactivated. Comparable techniques may be used to selective switch between operation of different antenna zones that may be configured to have different types of antennas and/or different arrangements of antennas. This type of switching between multiple antenna suites/zones may occur for instance if the accessory device covers and/or in some way blocks or interferes with operation of the antenna zone 302 in the second orientation. Various different orientations are contemplated, examples of which are described in relation to FIGS. 10-12.

Figure 10:
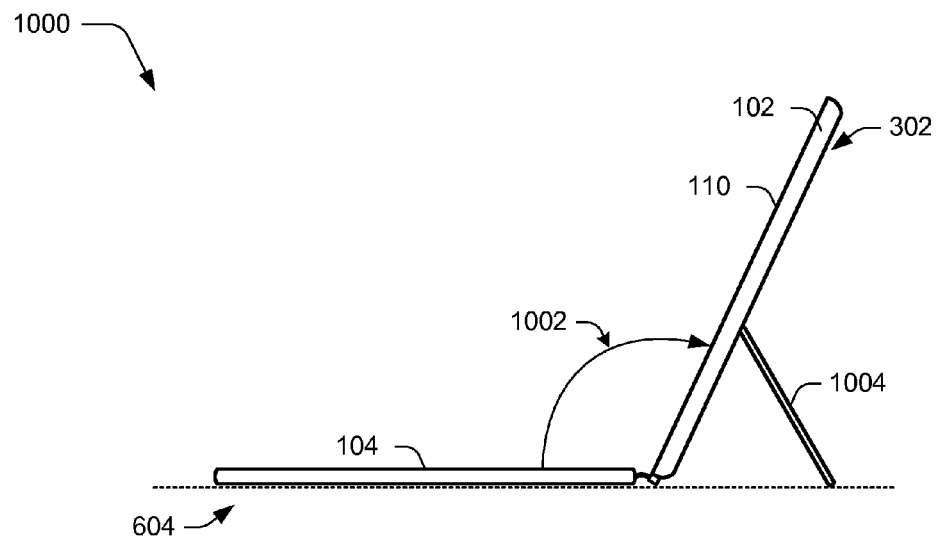
FIG. 10 depicts an example orientation of the accessory device in relation to the computing device.

FIG. 10 illustrates an example orientation 1000 of the computing device 102. In the orientation 1000, the accessory device 104 is laid flat against a surface and the computing device 102 is disposed at an angle 1002 to permit viewing of the display device 110, e.g., such as through use of a kickstand 1004 disposed on a rear surface of the computing device 102. The orientation 1000 can correspond to a typing arrangement whereby input can be received via the accessory device 104, such as using keys of a keyboard, a track pad, and so forth. Here, an antenna zone 302 is shown at the top edge of the computing device 102. Optionally, another antenna zone may be provided by the accessory device 104, such as an antenna zone 604 located at the bottom edge of the accessory device 104. In different orientations, the different zones may become more or less effective for various kinds of wireless communication. For example, different zones may become blocked and unblocked as the device is manipulated into different orientations. Thus, in some instance multiple zones may be employed in combination and/or as alternatives as described previously.

Figure 11:
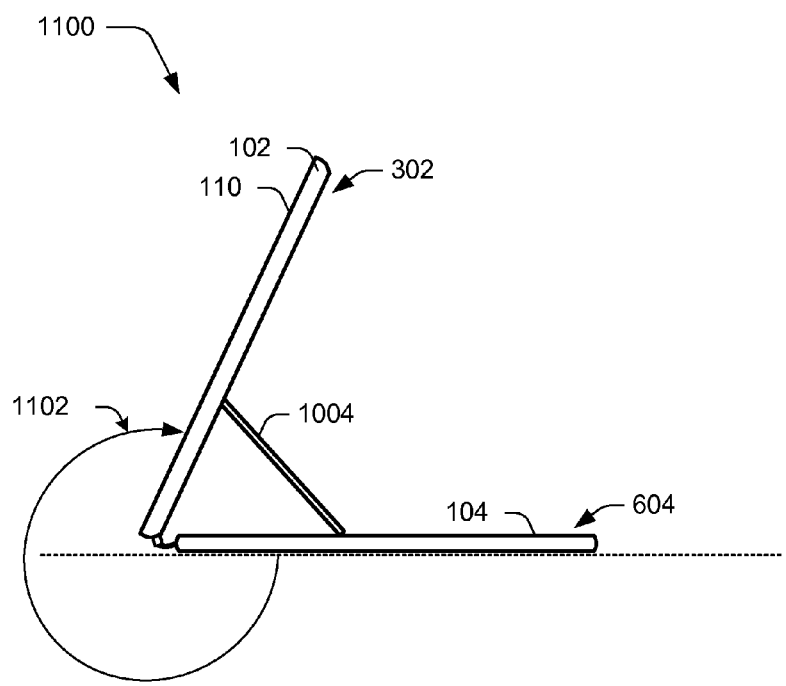
FIG. 11 depicts an example orientation of the accessory device in relation to the computing device.

FIG. 11 illustrates a further example orientation of the computing device 102, generally at 1100. In the orientation 1100, the computing device 102 is oriented at an angle 1102 such that the display device 110 faces away from the accessory device 104. In this example, the kickstand 1004 can support the computing device 102, such as via contact with a back surface of the accessory device 104. Although not expressly illustrated here, a cover can be employed to cover and protect a front surface of the accessory device 104.

Figure 12:
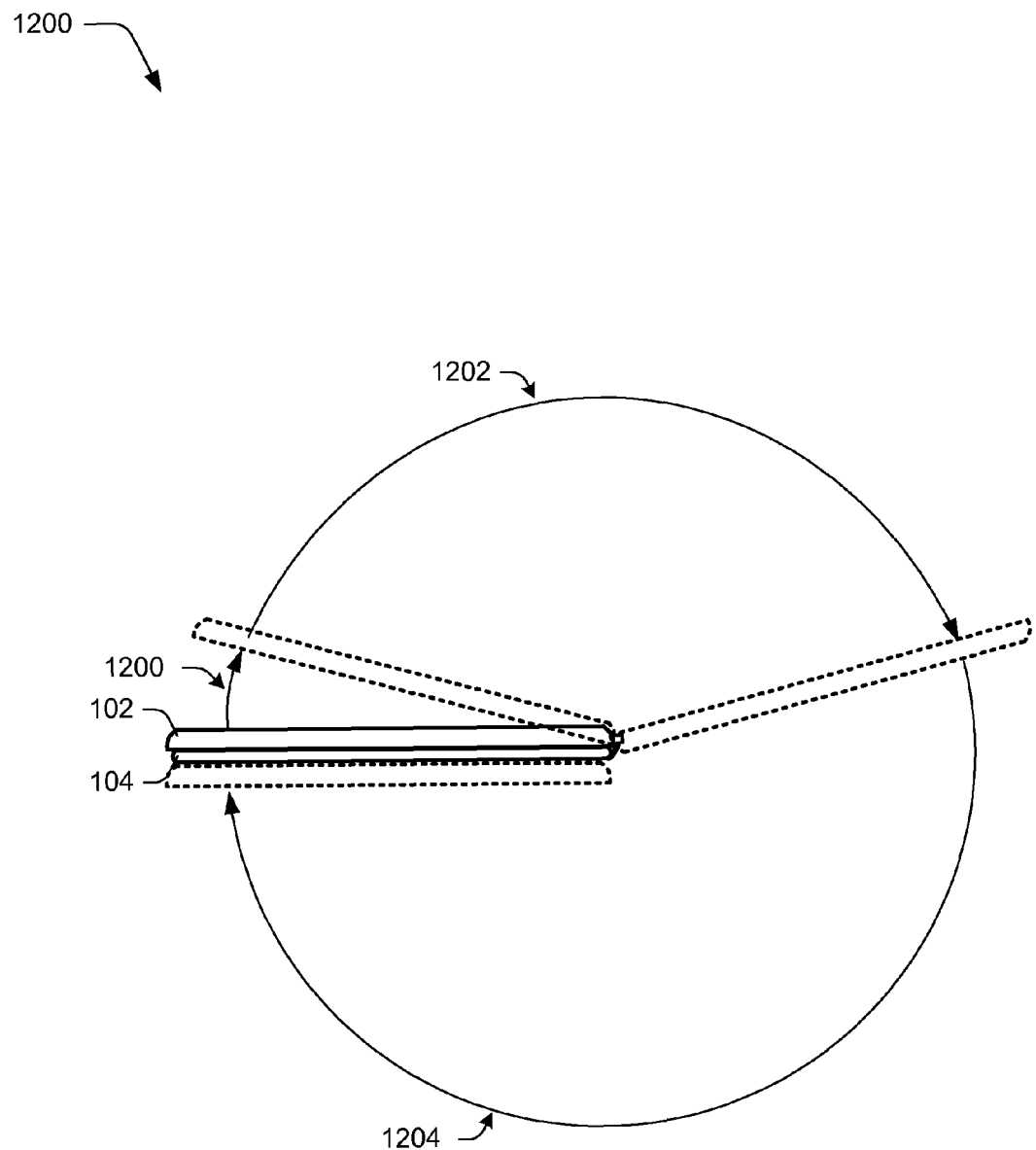
FIG. 12 depicts illustrates some example rotational orientations of the computing device in relation to the accessory device.

FIG. 12 illustrates that the computing device 102 may be rotated within a variety of different angle ranges with respect to the accessory device 104. Different angle ranges can be associated with different power states, different application states, use of different wireless antennas/antennas zones, and so on.

An angle range 1200 is illustrated, which corresponds to a closed position for the computing device 102. Thus, if the computing device 102 is positioned at an angle within the angle range 1200 relative to the accessory device 104, the computing device 102 can be determined to be in a closed position. A closed position can include an associated closed state where various functionalities/behaviors for the computing device 102 and accessory device 104 including antenna operations can be modified accordingly based on the closed state. This may include switching between different antenna zones, selectively turning antennas on/off, selecting various wireless functionality provided by one or more antenna suites 114, and so forth.

Further illustrated is an angle range 1202, which may correspond to a typing orientation for the computing device 102. Thus, if the computing device 102 is positioned at an angle within the angle range 1002 relative to the accessory device 104, the computing device 102 can be determined to be in a typing orientation. Within this orientation, the computing device 102 and/or the accessory device 104 can be placed in a typing power state where functionalities/behaviors for the computing device 102 and accessory device 104 including antenna operations can be customized accordingly based on the typing state.

FIG. 12 further illustrates an angle range 1204, which corresponds to a viewing position for the computing device 102. Thus, if the computing device 102 is positioned at an angle within the angle range 1204 relative to the accessory device 104, the computing device 102 can be determined to be in a viewing orientation. In this orientation, functionalities/behaviors for the computing device 102 and accessory device 104 including antenna operations can be controlled accordingly based on the viewing state.

Having discussed some example antenna placement details, consider an example procedure in accordance with one or more implementations.

Example Procedures

The following discussion describes antenna placement techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks.

Figure 13:
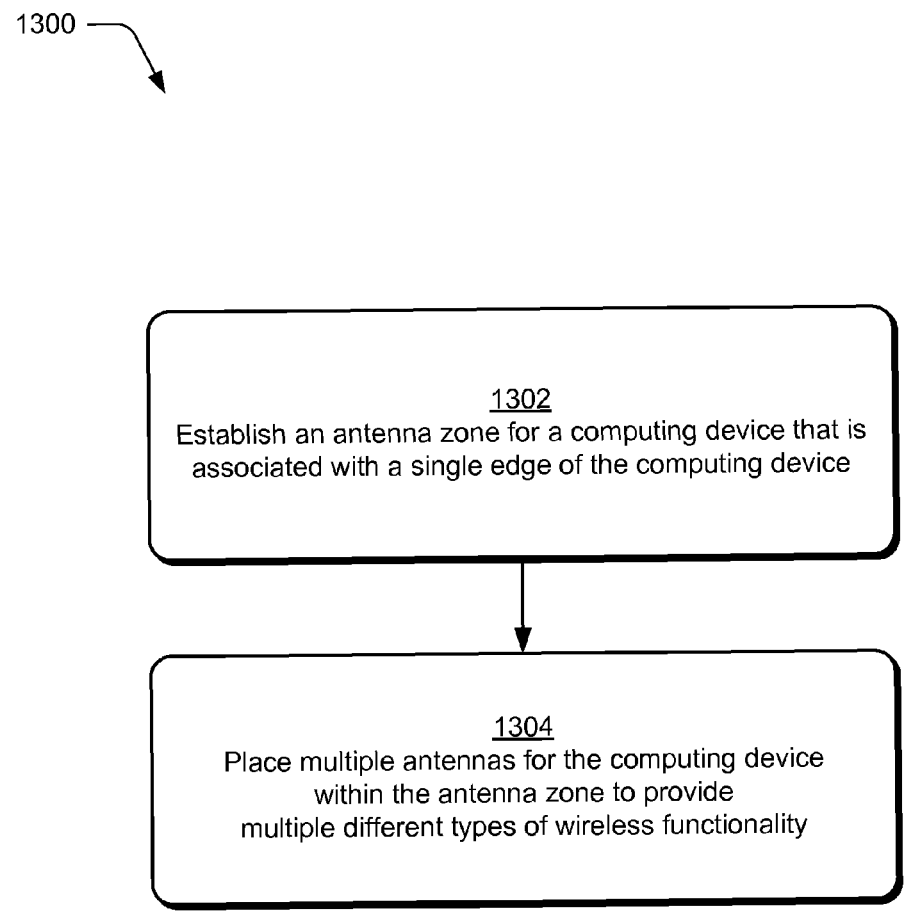
FIG. 13 is a flow diagram that describes an example procedure in which antenna placement occurs for a computing device.

FIG. 13 depicts an example procedure 1300 in which antenna placement occurs for a computing device. An antenna zone for a computing device is established that is associated with a single edge of the computing device (block

1302). Multiple antennas for the computing device are placed within the antenna zone to provide multiple different types of wireless functionality (block 1304). For example, one or more antenna zones may be established using various design considerations as discussed previously. In one particular example, an antenna zone 302 may be established along a top edge for a computing device in a landscape orientation. Here, the computing device may be a tablet or slate device configured primarily for use in a landscape orientation. Zones in other places as well as combinations of two or more zones are also contemplated.

Various arrangements of an antenna suite 114 may be placed within the established antenna zone(s) examples of which are described above and below. Antennas within the antenna zone may enable a variety of wireless functionality including but not limited to one or more of Wi-Fi, Cellular, NFC, Bluetooth, and/or GNSS functionality. In an implementation functionality may be provided for at least cellular communications, Wi-Fi communications, and global navigation. In addition or alternatively, functionality may be provided for different combinations of cellular communications, Wi-Fi communications, and global navigation. These combinations may include for example, a combination of cellular communications and at least one other type of wireless functionality, a combination of Wi-Fi communications and at least one other type of wireless functionality, and/or a combination of global navigation and at least one other type of wireless functionality. Other wireless functionality such as NFC and/or Bluetooth may be included in addition to or as alternatives to the enumerated examples.

Having considered the foregoing example procedures, consider now a discussion of example systems and devices that may be employed to implement aspects of techniques in one or more embodiments.

Example System and Device

Figure 14:
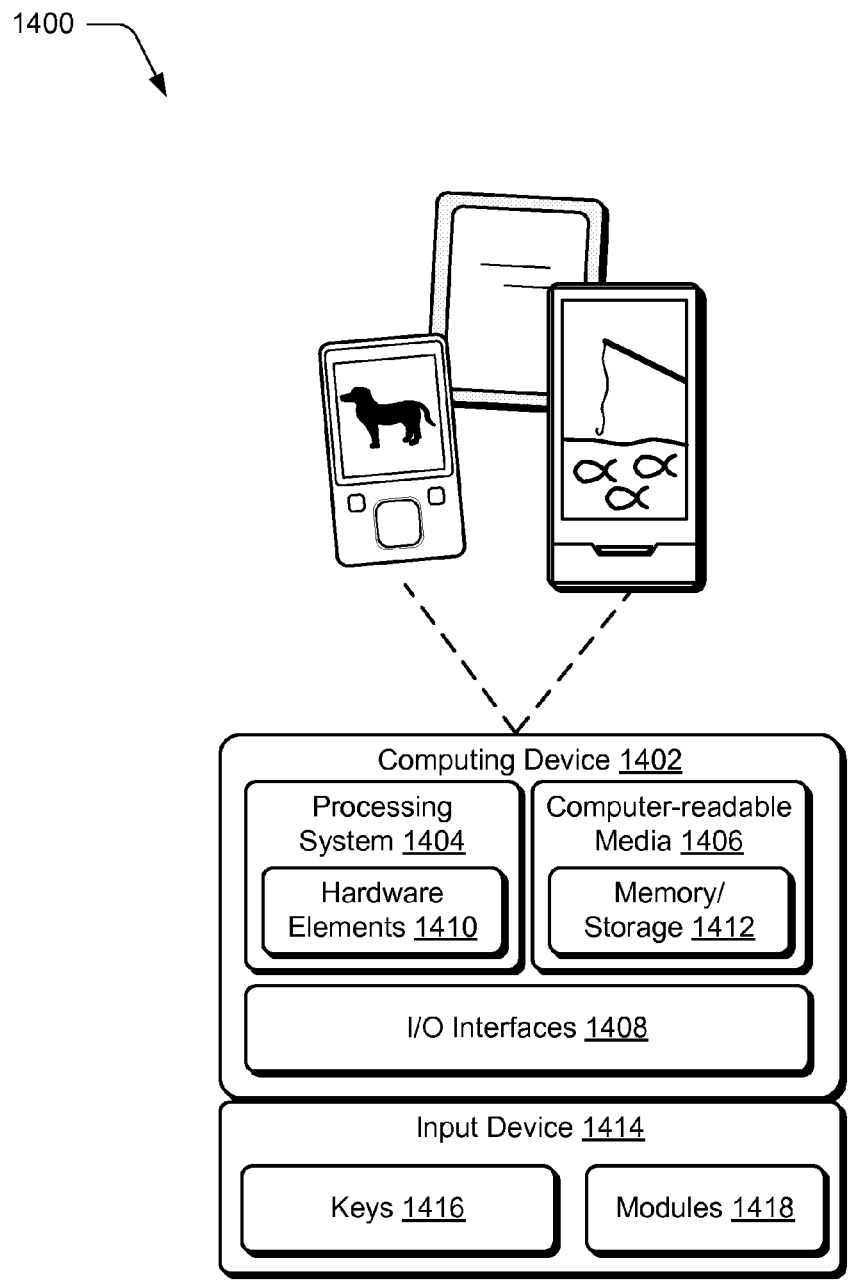
FIG. 14 illustrates an example system including various components of an example device that can be implemented as any type of computing device as described with reference to FIGS. 1-13 to implement techniques described herein.

FIG. 14 illustrates an example system generally at 1400 that includes an example computing device 1402 that is representative of one or more computing systems and/or devices that may implement the various techniques described herein. The computing device 1402 may, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1402 as illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways to support user interaction.

The computing device 1402 is further illustrated as being communicatively and physically coupled to an accessory device 1414 that is physically and communicatively removable from the computing device 1402. In this way, a variety of different accessory devices may be coupled to the computing device 1402 having a wide variety of configurations to support a wide variety of functionality. In this example, the accessory device 1414 includes one or more controls 1416, which may be configured as press-sensitive keys, mechanically switched keys, buttons, and so forth.

The accessory device 1414 is further illustrated as including one or more modules 1418 that may be configured to support a variety of functionality. The one or more modules 1418, for instance, may be configured to process analog and/or digital signals received from the controls 1416 to determine whether an input was intended, determine whether an input is indicative of resting pressure, support authentication of the accessory device 1414 for operation with the computing device 1402, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable media described previously.

Combinations of the foregoing may also be employed to implement various techniques described herein. Accordingly, software, hardware, or executable modules may be implemented as one or more instructions and/or logic embodied on some form of computer-readable media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
   establishing an antenna zone for a computing device that is associated with a single edge of the computing device;
   placing multiple antennas for the computing device within the antenna zone to provide multiple different types of wireless functionality, the multiple antennas including at least a pair of antennas that provide the same type of wireless functionality placed along the single edge; and
   selectively switching between operation of antennas within the antenna zone and operation of antennas placed in locations outside of the antenna zone in response to rotation of an accessory device connected to the computing device into different orientations relative to the computing device.

2. A method as described in claim 1, wherein the single edge is a top edge of the computing device in a landscape orientation.

3. A method as described in claim 1, wherein the computing device is a tablet device.

4. A method as described in claim 1, wherein the multiple different types of wireless functionality include functionality for at least cellular communications, Wi-Fi communications, and global navigation.

5. A method as described in claim 1, wherein the multiple different types of wireless functionality include functionality for Wi-Fi communications and at least one other type of wireless functionality.

6. A method as described in claim 1, wherein the multiple different types of wireless functionality include functionality for cellular communications and at least one other type of wireless functionality.

7. A method as described in claim 1, wherein the multiple different types of wireless functionality include functionality for global navigation and at least one other type of wireless functionality.

8. A method as described in claim 1, wherein the multiple antennas include dual two-by-two multiple input multiple output (MIMO) antennas for Wi-Fi communications placed along the single edge.

9. A method as described in claim 1, wherein the multiple antennas include a pair of cellular antennas for cellular communications placed at opposite corners of the device along the single edge.

10. A computing device comprising:
    an antenna zone established for the computing device along a single, designated edge of the computing device to contain each of multiple antennas provided for the computing device;
    an antenna suite having each of the multiple antennas placed within the antenna zone along the single, designated edge to provide functionality for cellular communications and at least one other type of wireless functionality; and an interface connectable to an accessory device such that the accessory device is configured to rotate into different orientations relative to the computing device, the computing device configured to selectively switch one or more of the multiple antennas on and off responsive to manipulation of the accessory device into the different orientations.

11. The computing device as described in claim 10, wherein the designated edge is a top edge of the computing device in a landscape orientation.

12. The computing device as described in claim 10, wherein the functionality for cellular communications is provided by a pair of cellular antennas placed at opposite corners of the device along the designated edge and the at least one other type of wireless functionality is provided by one or more antennas placed between the pair of cellular antennas along the designated edge.

13. The computing device described in claim 10, wherein the antenna zone comprises a pair of Wi-Fi antennas placed at opposite corners of the device along the designated edge to provide Wi-Fi communication functionality and one or more cellular antennas placed between the pair of Wi-Fi antennas to provide the cellular communications.

14. The computing device described in claim 10, further comprising multiple antennas zones including the antenna zone along multiple edges of the computing device.

15. The computing device described in claim 10, wherein the multiple antennas include one or more cellular antennas to provide the cellular communications and one or more Wi-Fi, near field communication (NFC), global navigation satellite system (GNSS), or Bluetooth antennas to provide the at least one other type of wireless functionality.

16. A tablet device comprising:
a processing system;
an antenna zone established for the tablet device along a top edge of the tablet device in a landscape orientation;
an antenna suite of multiple antennas located within the antenna zone along the top edge, the multiple antennas including a pair of cellular antennas to provide cellular communications, a pair of Wi-Fi antennas for Wi-Fi communications, and a global navigation satellite system (GNSS) antenna to provide global navigation functionality;
an interface connectable to an accessory device having another antenna zone including at least one antenna to duplicate functionality provided by one or more of the multiple antennas in the antenna zone along the top edge, the tablet device configured to switch between using antennas in the antenna zone along the top edge and antennas include in the antenna zone of the accessory device based on orientation of the accessory device relative to the tablet device.

17. A tablet device as recited in claim 16, wherein the pair of cellular antennas is located at opposite corners of the tablet device along the top edge.

18. A tablet device as recited in claim 17, wherein the pair of Wi-Fi antennas and the GNSS antenna are located between the pair of cellular antennas along the top edge.

19. A tablet device as recited in claim 18, wherein the GNSS antenna is located substantially at the center of the top edge and the pair of Wi-Fi antennas is located in spaces on either side of the GNSS antenna between the GNSS antenna and the pair of cellular antennas placed at the corners.

20. A tablet device as recited in claim 16, wherein the antenna suite of multiple antennas further comprises at least one of a near field communication (NFC) antenna or a Bluetooth antenna.

* * * * *